United States Patent [19]
Corrigan

[11] Patent Number: 5,320,988
[45] Date of Patent: Jun. 14, 1994

[54] PROCESS FOR PREPARING POLYCRYSTALLINE CBN CERAMIC MASSES AND RESULTING PRODUCT

[75] Inventor: Francis R. Corrigan, Westerville, Ohio

[73] Assignee: General Electric Company, Worthington, Ohio

[21] Appl. No.: 985,500

[22] Filed: Dec. 1, 1992

Related U.S. Application Data

[60] Continuation of Ser. No. 695,232, May 2, 1991, abandoned, which is a division of Ser. No. 366,943, Jun. 16, 1989, Pat. No. 5,043,120, which is a continuation-in-part of Ser. No. 269,965, Nov. 10, 1988, abandoned.

[51] Int. Cl.$^5$ .............................................. C04B 35/58
[52] U.S. Cl. .................................. 501/96; 51/307
[58] Field of Search ................... 51/293, 307, 309; 501/96, 97, 98; 423/290

[56] References Cited

U.S. PATENT DOCUMENTS

| | | | |
|---|---|---|---|
| 4,089,931 | 5/1978 | Sharma et al. | 501/96 X |
| 4,188,194 | 2/1980 | Corrigan | 51/307 |
| 4,201,757 | 5/1980 | Corrigan | 423/290 |
| 4,514,355 | 4/1985 | Montgomery | 264/346 X |
| 4,590,034 | 5/1986 | Hirano et al. | 501/96 X |
| 4,673,414 | 6/1987 | Lavens et al. | 51/293 |
| 4,776,861 | 10/1988 | Frushour | 51/293 |
| 4,904,625 | 2/1990 | Shaffer | 501/96 X |
| 5,011,514 | 4/1991 | Cho et al. | 51/295 |
| 5,015,265 | 5/1991 | Corrigan et al. | 51/293 |
| 5,043,304 | 8/1991 | Yoshida et al. | 501/96 |
| 5,106,792 | 4/1992 | Corrigan | 501/96 |
| 5,108,966 | 4/1992 | Holt et al. | 501/96 |

*Primary Examiner*—Anthony Green
*Assistant Examiner*—A. Wright

[57] ABSTRACT

Disclosed is a process for preparing sintered polycrystalline CBN/ceramic conjoint masses in an HP/HT process which comprises subjecting a mixture of GBN and one or more of a ceramic material or metal which reacts with BN to form a ceramic material, to HP/HT conditions for inducing conversion of said GBN to CBN, inducing conversion of any of said metal to its corresponding metal ceramic, and forming said CBN/ceramic conjoint mass.

6 Claims, 1 Drawing Sheet

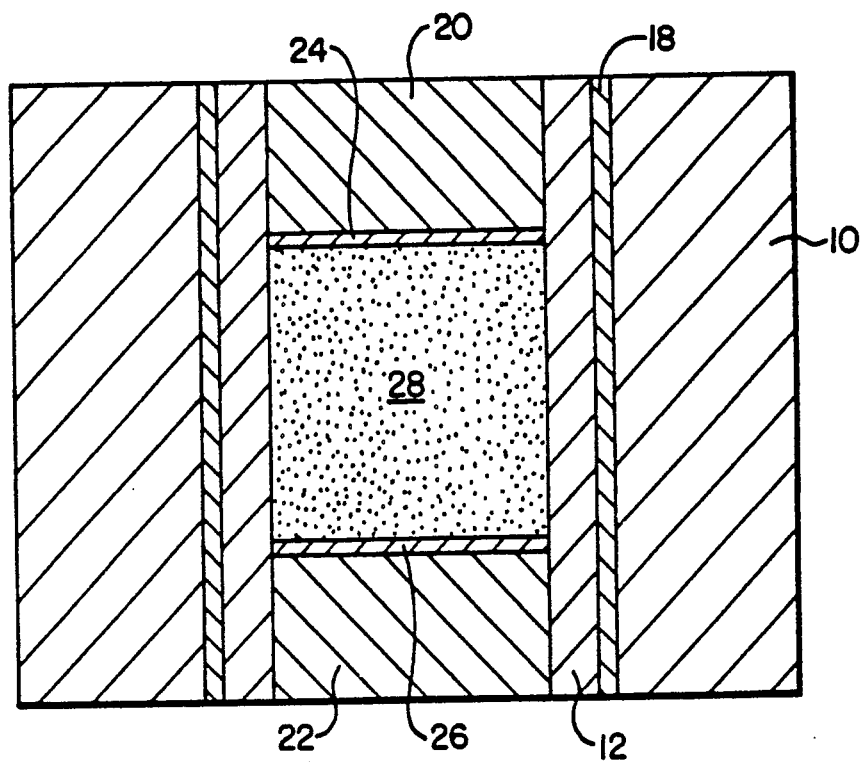

PROCESS FOR PREPARING POLYCRYSTALLINE CBN CERAMIC MASSES AND RESULTING PRODUCT

This application is a continuation of U.S. application Ser. No. 07/695,232, filed May 2, 1991, now abandoned; which is a division of U.S. application Ser. No. 07/366,943, filed Jun. 16, 1989, now U.S. Pat. No. 5,043,120; which is a continuation in part of U.S. application Ser. No. 07/269,965, filed Nov. 10, 1988, now abandoned.

BACKGROUND OF THE INVENTION

The present invention relates to a high pressure/high temperature (HP/HT) process for making cubic boron nitride (CBN) ceramic masses and more particularly to a process which utilizes a single HP/HT processing operation in the manufacture of CBN ceramic masses.

The manufacture of CBN by the HP/HT process is known in the art and is typified by the process described in U.S. Pat. No. 2,947,617, a basic monocrystalline CBN case. U.S. Pat. No. 4,188,194 describes a process for making sintered polycrystalline CBN compacts which utilizes pyrolytic hexagonal boron nitride (PBN) in the absence of any catalyst. An improvement on such direct conversion process is disclosed in U.S. Pat. No. 4,289,503 wherein boric oxide is removed from the surface of the HBN powder before the conversion process.

A compact is a mass of abrasive particles bonded together in a self-bonded relationship (see U.S. Pat. Nos. 3,852,078 and 3,876,751); by means of a bonding medium (see U.S. Pat. Nos. 3,136,615, 3,233,988, 3,743,489, 3,767,371, and 3,918,931); or by means of combinations thereof. A composite compact is a compact bonded to a substrate material, such as cemented metal carbide. U.S. Pat. No. 3,918,219 teaches the catalytic conversion of hexagonal boron nitride (HBN) to CBN in contact with a carbide mass to form a composite CBN compact. Compacts or composite compacts may be used in blanks for cutting tools, drill bits, dressing tools, and wear parts (see U.S. Pat. Nos. 3,136,615 and 3,233,988).

Sintered CBN/cermet compacts prepared by HP/HT pressing of mixtures of CBN, various cermets, and aluminum compounds (with or without metal additions) are disclosed in U.S. Pat. Nos. 4,334,928 and 4,389,465. U.S. Pat. No. 4,394,170 proposes a composite sintered compact containing high density BN (CBN and Wurtzite boron nitride, WBN), ceramic and various metal bases obtained by HP/HT processing of mixtures of CBN, WBN, and various ceramic and metal mixtures. A supported version of such CBN/cermet compact is disclosed in U.S. Pat. No. 4,403,015. These prior CBN cermet compact disclosures, however, must initially make the CBN in one HP/HT step and the CBN cermet product in a second HP/HT step. Extra wear of the HP/HT presses, reduced throughput, and increased manufacturing costs result from the use of two different HP/HT processing operations.

BROAD STATEMENT OF THE INVENTION

The present invention is directed to a HP/HT process for making sintered polycrystalline CBN/ceramic conjoint masses utilizing a single HP/HT processing operation. Such method comprises subjecting, in the absence of bulk catalytically-active material, a mixture of graphitic boron nitride (GBN) and one or more of a ceramic material, a metal which reacts with boron nitride (BN) to form a ceramic material, or mixture thereof (hereinafter, sometimes referred to as "second phase" or "second phase component(s)"), to HP/HT conditions for inducing conversion of GBN to CBN, inducing conversion of any of said metal to a corresponding metal ceramic, and forming said CBN/ceramic mass. One technique for forming the initial reaction mixture for subjecting to the HP/HT process of the present invention involves the mixing of GBN powder and second phase powder. As the particle size of these powders decreases, however, surface contamination may interfere with boron nitride conversion and/or sintering, thus special processing techniques often need to be employed (as described more fully below).

Conversion of "pristine" GBN/second phase mixtures to form CBN conjoint masses would be advantageous with respect to obtaining high purity composites via the elimination of the difficult mixing and cleaning steps needed in preparing CBN-based composites by conventional HP/HT conversion/sintering methods utilizing individually-prepared mixed powders. Accordingly, another aspect of the present invention involves the production of the feed GBN with simultaneous concomitant formation and/or deposition of the second phase component(s) in a form suitable for subjecting to HP/HT processing for forming the novel CBN/ceramic conjoint masses of the present invention. Such reaction mixture is termed "pristine" for present purposes due to the substantial absence of impurities in the GBN/second phase reaction mixture. The resulting CBN/ceramic conjoint mass forms another aspect of the present invention.

Advantages of the present invention include the ability to prepare CBN/ceramic masses directly from the low pressure form of BN. Another advantage is the ability to prepare such masses in a single HP/HT processing operation. Yet another advantage is the concomitant extension of the useful life of the HP/HT presses and increased throughput occasioned by the one-step HP/HT processing operation disclosed herein. These and other advantages will become readily apparent to those skilled in the art based upon the disclosure contained herein.

BRIEF DESCRIPTION OF THE DRAWING

The drawing illustrates, in cross-section, a configuration of reaction zone assembly or cell which was utilized in the examples, such cell being further described in U.S. Pat. Nos. 2,947,611, 2,941,241, and 2,941,248. The drawing will be described in further detail in connection the the examples contained herein.

DETAILED DESCRIPTION OF THE INVENTION

The sintered polycrystalline CBN/ceramic masses of the present invention can be prepared in situ by HP/HT pressing of mixtures of low pressure form BN powders (GBN) and one or more of a ceramic material (including cermet) or metal. The temperature and pressure conditions utilized are sufficient to convert the low pressure phase BN to the cubic phase, and any metal powder to a ceramic material, for example, by reaction of the metal with the BN phase of the reaction mixture subjected to the process. The proportion of GBN in the starting mixture can range from about 10 to 95 volume- % with the balance being composed of the ceramic material and/or metal. The GBN reactant can range in size on up to 1.5 mm, though typical size ranges of GBN in commercial operations ranges from about 0.1 to 10 microns in particle size. The ceramic/metal phase of the reaction mixture broadly ranges from about 0.1 to 100 microns in particle size. It is important that no impurities which inhibit the transformation of GBN to CBN be included in the reaction mixture. Depending on the ceramic material in the starting mixture (e.g. TiN), conventional handling and preprocessing of the GBN phase may be desirable, such as, for example, removal of boric oxide from the surface of HBN powder as taught in U.S. Pat. No. 4,289,503. With other ceramic materials (e.g. $AlB_{12}$, $NiAl_3$, $MgB_2$), however, such vacuum firing pre-processing is not required as the ceramic material evidently suppresses oxygen inhibition in the CBN conversion process.

Although new process development may result in alternative techniques for implementation of the starting material modifications of the present invention, chemical vapor deposition (CVD), solgel and polymer pyrolysis techniques, and combustion synthesis processes should be particularly suitable techniques for producing "pristine" GBN/second phase mixtures for subjecting to the HP/HT process disclosed herein.

CVD processes currently are used in a variety of fields as those in the art will appreciate. Commercially, CVD is used to produce pyrolytic boron nitride, for example. In this process, boron trichloride and ammonia gases are allowed to flow through a high temperature furnace where reaction occurs and boron nitride is deposited on suitable substrates yielding large macroscopic pieces. This process can be adapted suitably to the production of the various type of modified starting materials disclosed herein. Introduction of suitable gases during the pyrolytic BN deposition process allows for codeposition of various second phases during the PBN deposition, e.g. introduction of $TiCl_4$ gas to obtain BN/TiN composites. By alternating the gas flow through the furnace, alternate layer type structures also could be obtained. Since the resulting products are obtained as large pieces, internal purity is maintained prior to HP/HT conversion of the GBN composites to yield CBN based composites. These same processing techniques should be available for deposition of a variety of ceramic and ceramic-forming metals. Further information on CVD codeposition may be found in the following citation: Moore, et al., "Properties and Characterization of Co-deposited Boron Nitride and Carbon Materials", to be published in *J. Appl. Phys.*, June, 1989.

It should be possible to disperse secondary phases in low pressure boron nitride during preparation by solgel techniques to form BN/secondary phase mixes for subsequent use as a starting material for the HP/HT preparation of CBN conjoint masses. The dispersion would comprise composite-forming materials (i.e., TiN, TiC, or the like) for preparing CBN based composites. Since the solgel method for preparing BN starts with a liquid, incorporation of a second phase during solgel processing will allow obtaining extremely good homogeneity of fine powder mixtures with BN which is difficult to accomplish by mixing of BN in secondary phase powders, for example. The solgel prepared mixtures would yield more uniformly dispersed and finer particle mixtures as starting materials for CBN production processes in accordance with the present invention and allow preparation of improved homogeneity of fine grain CBN composites. Further on solgel techniques can be found in Narula, "Precursors to Boron-Nitrogen Macromolecules and Ceramics", *Mat. Res. Soc. Symp. Proc.*, vol. 73, 383, Materials Research Society (1986) and *Research and Development*, Dec. 1987, p. 49.

Combustion synthesis is a relatively new process for producing refractory compounds. BN and various nitride composite materials have been reported to be prepared by this process. The products can be obtained in solid, compacted form which would allow maintenance of purity prior to HP/HT processing. Because combustion synthesis involves high temperatures with rapid heating and cooling rates, the possibility of producing non-equilibrium materials is enhanced greatly (cubic TaN was first reported by combustion synthesis before it was synthesized by high pressure techniques). Further information on combustion synthesis can be found in the following: "Combustion Synthesis: A New Area of Research in Materials Science", Los Alamos National Laboratory report pp. 11–29 (circa 1985).

With respect to the ceramic (which includes cermet for present purposes) phase in the reaction mixture, such ceramics are taught in the art to be a carbide, nitride, carbonitride, boride, or silicide, of a variety of metals including, for example, aluminum, titanium, silicon, chromium, hafnium, zirconium, tantalum, molybdenum, niobium, vanadium, and tungsten. If a cermet is used in the reaction mixture, the metal for bonding the ceramic can include metals such as nickel, cobalt, chromium, manganese, iron, molybdenum, tungsten, vanadium, aluminum, magnesium, silicon, titanium, zirconium, hafnium, and the like and mixtures thereof. In this regard, reference is made to the references in the Background section which utilize alternative processing techniques for forming polycrystalline CBN/ceramic masses. Such lists of ceramics and cermets are appropriate for present purposes.

Intact polycrystalline masses may be cleaned to remove any adhering carbon, titanium, or other material. After cleaning, the samples can be milled to sizes which may be used in making resin bonded grinding wheels, metal bonded grinding wheels, metal bonded saw elements, and like conventional cutting and abrading tools; or the disk and cylinder shaped pieces may be shaped for cutting tool applications. In this regard, the masses may be used in unsupported or in conventional supported form utilizing a tungsten carbide or other appropriate support material. Joining to a support may be achieved via brazing or other technique after transformation of the reaction mixture to the novel polycrystalline CBN/ceramic compact.

HP/HT cells or apparatus are known in the art, such as described in U.S. Pat. No. 4,289,503. With respect to the drawing which depicts the reaction cell assembly utilized in making the samples in the Examples which follow, pyrophyllite cylinder bushing 10 which alternatively may be made of glass, soft ceramic, talc, alkali halide, steatite, or forms of soapstones has positioned concentrically within graphite resistance heater tube 12 about which metal foil wrap or shield metal 18 is placed. Shield metal 18 is a refractory metal which may be selected from the group consisting of zirconium, titanium, tantalum, tungsten, and molybdenum.

Disposed within graphite resistance heater tube 12 are upper and lower graphite plugs 20 and 22 adjacent which graphite disks 24 and 26 are placed. Within graphite disks 24 and 26 resides reaction sample 28 which is comprised of a mixture of GBN and one or more of a ceramic material or metal which reacts with BN to form a ceramic material. It will be observed that reaction mixture 28 may be densified prior to its being placed in the reaction cell. Such densification results by the high pressure pressing of the reaction mixture without application of high temperature heating. Such densification or consolidation of reaction mixtures in the super atmospheric pressure art is a known preprocessing step which is practiced in conventional fashion for present purposes. Temperatures ranging from about 1500° to 2300° C. with pressures ranging from about 45 to 80 Kbars, then, would be expected to be appropriate for forming the novel CBN/ceramic masses.

The following examples show how the invention has been practiced but should not be construed as limiting. In this application, all citations are incorporated expressly herein by reference.

IN THE EXAMPLES

Example 1

A 6.8 g sample of a mixture comprising 40.3 wt-% TiN and 59.7 wt-% PBN powder was prepressed at about 50 kpsi in a hardened steel mold at room temperature and inserted directly from the mold into the HP/HT cell as set forth in the drawing. The TiN powder used in the reaction mixture was −325 mesh size (United States Sieves Series, average particle size of about 5 microns). The PBN powder (less than 14 mesh average particle size) was vacuum fired at 1700° C. for approximately 4 hours prior to its incorporation into the reaction mixture for prepressing. This vacuum heat treatment resulted in a weight loss of about 6 wt-%, primarily due to partial thermal decomposition with the evolution of nitrogen (see U.S. Pat. No. 4,289,503) and resultant boron surface enrichment.

The sample in the reaction cell was pressed at a force of about 65 kbar and a temperature of about 1800° C. for four minutes. Thereafter, the sample was recovered from the cell in the form of a large, compacted mass primarily disk-shaped with the individual CBN particles obtained on conversion of the PBN particles clearly visible in the titanium nitride matrix. Additional samples totaling 600 g were pressed in the same manner described herein. The resulting composite masses were treated with a 10% nitric/sulfuric acid mixture to remove adhering carbon and then milled to mesh size particles (−40 mesh) suitable for grinding applications.

Example 2

The procedure described in Example 1 was implemented to press a total of 585 g of a reaction mixture comprising 48.8 wt-% TiC (1.5 micrometers average particle size) and 51.2 wt-% PBN powder (−14 mesh, vacuum fired as described in Example 1). Each reaction mixture in the cell comprised 7.2 g total weight. The samples were pressed at a force of about 65 kbar at a temperature of about 1800° C. for four minutes pressing time. During pressing, the PBN particles were converted to CBN, yielding large, primarily disk-shaped conjoint masses.

Example 3

A series of press runs were made on additional samples of vacuum-fired HBN (5 wt-% weight loss) which were mixed with TiN and $AlB_{12}$ having a composition as set forth below.

TABLE 1

| Sample No. | Composition (wt-%) | | |
|---|---|---|---|
| | HBN | TiN | $AlB_{12}$ |
| TN7 | 39.06 | 60.04 | — |
| TN8 | 44.86 | 42.00 | 13.14 |
| TN10 | 52.57 | 41.01 | 6.42 |
| TN11 | 62.13 | 34.62 | 3.25 |
| TN12 | 64.50 | 28.75 | 6.75 |
| TN13 | 77.72 | 15.16 | 7.12 |

Conversions of the HBN to CBN with sintering into CBN/cermet conjoint masses were obtained at pressing levels ranging from about 50 to 65 kbar and temperatures ranging from about 1500° to 2000° C. Press times of about 4 to 20 minutes were used.

Sample TN13 was ground to size for use as a cutting tool insert (1.11 cm diameter by 0.32 cm thick, 7/16 inch diameter by ⅛ inch thick). Comparison cutting tests were conducted with cutting tool insert TN13 and a commercially available CBN-based cutting tool. The workpiece subjected to the cutting test comprises hardened D2 steel (Rockwell hardness, $R_c$ scale, 59–61). The test conditions and results recorded are set forth below.

TABLE 2

D2 STEEL CUTTING TEST RESULTS
Cutting Speed: 200 SFPM
Infeed: 0.010 IPR
Depth of Cut: 0.050 in.

| Sample No. | Cutting Time (min) | Workpiece Volume Removed (in$^3$) | Flank Wear (in) | Crater Wear (in) | Volume per mil Flank Wear in$^3$/.001 in |
|---|---|---|---|---|---|
| Commercial* tool | 7.07 | 7.8 | 0.0049 | 0.0013 | 1.59 |
| TN13 | 7.64 | 9.1 | 0.0039 | 0.0003 | 2.33 |

*BZN Compact which is a cemented WC supported polycrystalline CBN compact, General Electric Co., Worthington, Ohio.

The above-tabulated results show improved wear performance for inventive CBN/cermet mass TN13 compared to the commercially available CBN compact also tested. Significantly, the inventive masses are made by a simplified one-step process. Thus, the invention provides improved processing in the manufacture of the conjoint masses which have improved properties.

Example 4

The reaction mixture comprised 35.7 wt-% titanium metal powder (−325 mesh particle size) and 64.3 wt-% vacuum-fired HBN powder. This reaction mixture was pressed at 65 kbar and 1800° C. for four minutes. Confirmation of the reaction of titanium metal with a portion of the BN phase in the reaction mixture to form TiN during the HP/HT processing was evidenced by the gold coloring of the resulting CBN-based mass. The sample was machined to the tool insert size set forth in Example 3 and tested by turning a hardened 4340 steel workpiece (Rockwell hardness, $R_c$ scale, 48–52). The results recorded are set forth below:

TABLE 3

4340 STEEL CUTTING TEST RESULTS
Cutting Speed: 200 SFPM
Infeed: 0.010 IPR
Depth of Cut: 0.050 in.

| Sample No. | Cutting Time (min) | Workpiece Volume Removed (in³) | Flank Wear (in) | Crater Wear (in) | Volume per mil Flank Wear in³/.001 in |
|---|---|---|---|---|---|
| T1 | 10.48 | 18.1 | 0.0085 | 0.005 | 2.13 |
| Commercial Tool* | 12.82 | 23.0 | 0.0158 | 0.0010 | 1.46 |

*See Table 2

Again, the above-tabulated results clearly demonstrate improved cutting performance being exhibited by the novel polycrystalline CBN/ceramic masses compared to a commercial polycrystalline CBN compact.

Example 5

A series of press runs were made using mixtures of unfired HBN with additions of TiN and $AlB_{12}$ using the same HBN powder source as in Example 3.

TABLE 4

| Sample No. | Composition (wt-%) | | |
|---|---|---|---|
|  | HBN | TiN | $AlB_{12}$ |
| TN14 | 28 | 60 | 12 |
| TN15 | 42 | 40 | 18 |
| TN16 | 50 | 40 | 10 |
| TN17 | 50 | 20 | 30 |
| TN18 | 56 | 20 | 24 |
| TN19 | 70 | 20 | 10 |

Conversion of the HBN to CBN with sintering into CBN/ceramic conjoint masses was obtained at pressures of from about 45 to 65 kbars and temperatures ranging from about 1500° to 2000° C. with pressing times of 4 minutes. This example demonstrates that firing of the HBN feed to remove surface oxygen content was not required by virtue of the TiN/$AlB_{12}$ addition.

Example 6

A mixture of 65 wt-% vacuum-fired HBN (10.0% weight loss), 30 wt-% TiN, and 5 wt-% $NiAl_3$ was pressed at a pressure of about 60 kbars and temperature of about 1800° C. for 4 minutes. The press run resulted in the conversion of the HBN feed to CBN and the production of a sintered intact CBN/cermet conjoint disc-shaped mass.

Example 7

A number of samples containing 60 wt-% vacuum-fired HBN (6.0% weight loss), 30 wt-% TiN, and 10 wt-% $MgB_2$ were pressed at pressures ranging from about 55 to 60 kbars and temperatures ranging from 1600° to 1800° C. for times of four minutes. The samples were recovered from the press as intact disc-shaped CBN/ceramic conjoint pieces.

I claim:

1. A cubic boron nitride (CBN)/titanium nitride conjoint mass wherein said CBN and said conjoint masses both were in situ formed in a high pressure/high temperature (HP/HT) process from a mixture consisting essentially of from between about 10 and 95 vol.-% of graphitic boron nitride (GBN) and titanium nitride powder which reacts with BN to form CBN particles in a titanium nitride matrix, wherein said starting GBN is substantially impurity free.

2. The conjoint mass of claim 1 wherein said GBN in said mixture is in the form of particles having a size not above about 1.5 mm.

3. The conjoint mass of claim 2 wherein the GBN particle size in said mixture ranges from about 0.1 to 10 microns.

4. The conjoint mass of claim 1 wherein titanium nitride, in said mixture is in the form of particles having a particle size ranging from about 0.1 to 100 microns.

5. The conjoint mass of claim 1 wherein said GBN of said mixture has been vacuum-fired for removal of surface boric oxide.

6. The conjoint mass of claim 1 wherein said GBN of said mixture has been vacuum-fired to its partial decomposition and resultant surface boron enrichment.

* * * * *